US011786860B2

(12) United States Patent
Sahoo et al.

(10) Patent No.: US 11,786,860 B2
(45) Date of Patent: Oct. 17, 2023

(54) SOLVENT COMPOSITION FOR $CO_2$ CAPTURE AND A PROCESS MEDIATED THEREOF

(71) Applicant: INDIAN OIL CORPORATION LIMITED, Maharashtra (IN)

(72) Inventors: Prakash Chandra Sahoo, Faridabad (IN); Manoj Kumar, Faridabad (IN); Ravi Prakash Gupta, Faridabad (IN); Suresh Kumar Puri, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 86 days.

(21) Appl. No.: 17/468,388

(22) Filed: Sep. 7, 2021

(65) Prior Publication Data

US 2022/0072472 A1 Mar. 10, 2022

(30) Foreign Application Priority Data

Sep. 7, 2020 (IN) ............................ 202021038559

(51) Int. Cl.
*B01D 53/14* (2006.01)

(52) U.S. Cl.
CPC ..... *B01D 53/1493* (2013.01); *B01D 53/1425* (2013.01); *B01D 53/1475* (2013.01); *B01D 2252/10* (2013.01); *B01D 2252/2026* (2013.01); *B01D 2252/20415* (2013.01); *B01D 2252/20436* (2013.01); *B01D 2252/20484* (2013.01); *B01D 2252/604* (2013.01)

(58) Field of Classification Search
None
See application file for complete search history.

(56) References Cited

U.S. PATENT DOCUMENTS

2016/0166976 A1 6/2016 Bumb
2017/0173518 A1* 6/2017 Chen ...................... B01D 53/62
2018/0001255 A1 1/2018 Bumb

FOREIGN PATENT DOCUMENTS

WO 2012038868 3/2012
WO 2014118633 A2 8/2014
WO 2016027164 2/2016

* cited by examiner

*Primary Examiner* — Daniel Berns
(74) *Attorney, Agent, or Firm* — Maschoff Brennan

(57) ABSTRACT

The present invention relates to a biocompatible task specific hybrid solvent (TSHS) composition that synergistically increases the carbon capture efficiency and utilizes less energy for $CO_2$ desorption over the existing solutions. Further, the process of synthesizing such composition is discussed in this disclosure. Also, the present disclosure provides a process that involves a task specific hybrid solvent (TSHS) composition for selective capturing $CO_2$ from any gaseous stream.

15 Claims, 2 Drawing Sheets

Absorption rates Mol CO2/m².s.kPax 10³
6
5
4
3
2
1
0
0 1 2 3 4 5 6
CO2 loading Moles of CO2/Kg Solvent
MEA
TSHS-1
TSHS-2
TSHS-3
TSHS-4

SOLVENT COMPOSITION FOR $CO_2$ CAPTURE AND A PROCESS MEDIATED THEREOF

TECHNICAL FIELD

The present disclosure relates generally to energy and environmental Sciences. Specifically, the present invention discloses a solvent composition and a process for obtaining purified carbon dioxide from any stream containing the mixture of gases. More specifically, the disclosure relates to improved biocompatible task specific hybrid solvent (TSHS) composition that increases carbon capture efficiency and utilizes less energy for $CO_2$ desorption over the existing carbon dioxide capture solvent composition. Further, the present disclosure provides a process that involves a biocompatible task specific hybrid solvent (TSHS) composition for selective capturing $CO_2$ from any gaseous stream.

BACKGROUND ART

The main drawback of the conventional $CO_2$ capture process is the low $CO_2$ loading capacity of the solvent, low selectivity, and huge energy requirement for solvent regeneration in the stripper. Further, the conventional solvents have several disadvantages including chemical and thermal degradation and Corrosivity. Therefore, to overcome the limitations associated with the conventional solvent system it is important to develop novel solvent systems that have high $CO_2$ absorption capacity, high selectivity, high stability, and low solvent regeneration energy.

Various processes for $CO_2$ absorption and desorption have been disclosed in the prior art. In some inventions, the solvent formulation has been optimized by using a mixed solvent system to improve $CO_2$ capture.

US 2018/0001255 relates to a solvent composition for removing $CO_2$ and other gases from a gas stream by washing the gaseous stream with a solution containing a combination of physical and chemical solvents. The solvent composed of alkanol amine compound in an amount between 30 to 40 wt %, an activator to catalyze the reaction in an amount between 2 to 10 wt %, a physical solvent in an amount ranging between 10 to 25 wt %, and a carbonate buffer for use in an acid gas cleaning system.

WO2012/038868 describes a solvent composition for recovery of carbon dioxide from gaseous mixture, comprising diethanolamine, piperazine or its derivative, alkali salt, optionally along with cupric carbonate.

US 2016/0166976 describes a process, system for recovering $CO_2$ from gases using primary amino hindered alcohol or tertiary amine in combination with derivative of perazine with three or more amino groups as promoter and a carbonate buffer.

EP 2618914 discloses a solvent composition for recovery of carbon dioxide from a gaseous mixture, comprising diethanolamine, piperazine or its derivative, an alkali salt, along with cupric carbonate. The disclosure relates to improved solvent formulations that utilize less energy and increased carbon capture efficiency. The disclosure also addresses the high $CO_2$ loading capacity and energy requirement over the existing carbon dioxide capture solvent.

WO2016027164 A1 discloses a Methods and compositions useful, for example, for physical solvent carbon capture. The solvents may include an aqueous mixture of 2-amino-2-methylproponol, 2-piperazine-1-ethylamine, diethylenetriamine, 2-methylamino-2-methyl-1-propanol, and potassium carbonate or potassium carbonate buffer salt. The solvent may also contain less than about 75% by weight of dissolving medium (i.e., water) and may have a single liquid phase. The solvents and methods have favorable regeneration energies, chemical stability, vapor pressure, total heat consumption, net cyclic capacity, and reaction kinetics.

WO2014118633 A3 represents a solvent for recovery of carbon dioxide from the gaseous mixture, having alkanolamine, reactive amines acting as promoter or activators, glycol, and a carbonate buffer.

However, in the disclosed processes, $CO_2$ loading capacity, selectivity is limited by the concentration of the amine solution. In addition, the regenerated amine solution, although lean in $CO_2$, still contains some absorbed $CO_2$, which reduces its capacity. Thus, the effective, steady-state $CO_2$ removal rate is further lowered. So, higher circulation rates are required for removal of $CO_2$ to desired levels. Further, the solvent can corrode low alloy steel such as carbon steel. Thus, only amine solutions (in Water) with carefully controlled solution strengths are used to minimize corrosion of the absorption column, piping, and pumps. However, this diluted concentration requires higher circulation rates to achieve the desired $CO_2$ removal. High circulation rates require larger process equipment (capital expense), increased reboiler duty (energy/operating expense) and increased pumping costs (energy/operating expense).

Degradation of solvent is another issue. Amines may react with $CO_2$ (and $H_2S$, $NO_x$, or pollutants, or $O_2$ etc.) to form various products that are not reversible in the regeneration step. Amines may also degrade thermally and by oxidative rout. Disposal of the degradation products may also be a concern. Furthermore, energy is also required to generate steam within the amine regenerator to strip the $CO_2$ from the solvent. For some particularly strongly absorbing amines and for large circulation rates, this energy requirement can be very high and represents a significant operating expense.

Present invention overcomes the deficiencies in the prior arts by providing an improved biocompatible task specific hybrid solvent (TSHS) composition that synergistically increases the carbon capture efficiency and utilizes less energy for $CO_2$ desorption over the existing solutions.

SUMMARY OF THE INVENTION

Present invention is related to a biocompatible task specific hybrid solvent (TSHS) composition that synergistically increases the carbon capture efficiency and utilizes less energy for $CO_2$ desorption over the existing solutions. Further, the process of synthesizing such composition is discussed in this disclosure. Also, the present disclosure provides a process that involves a task specific hybrid solvent (TSHS) composition for selective capturing $CO_2$ from any gaseous stream.

BRIEF DESCRIPTION OF THE DRAWINGS

These and other features, aspects, and advantages of the present invention will become better understood when the following detailed description is read with reference to the accompanying drawings in which like characters represent like parts throughout the drawings wherein.

DETAILED DESCRIPTION

Figure 1:
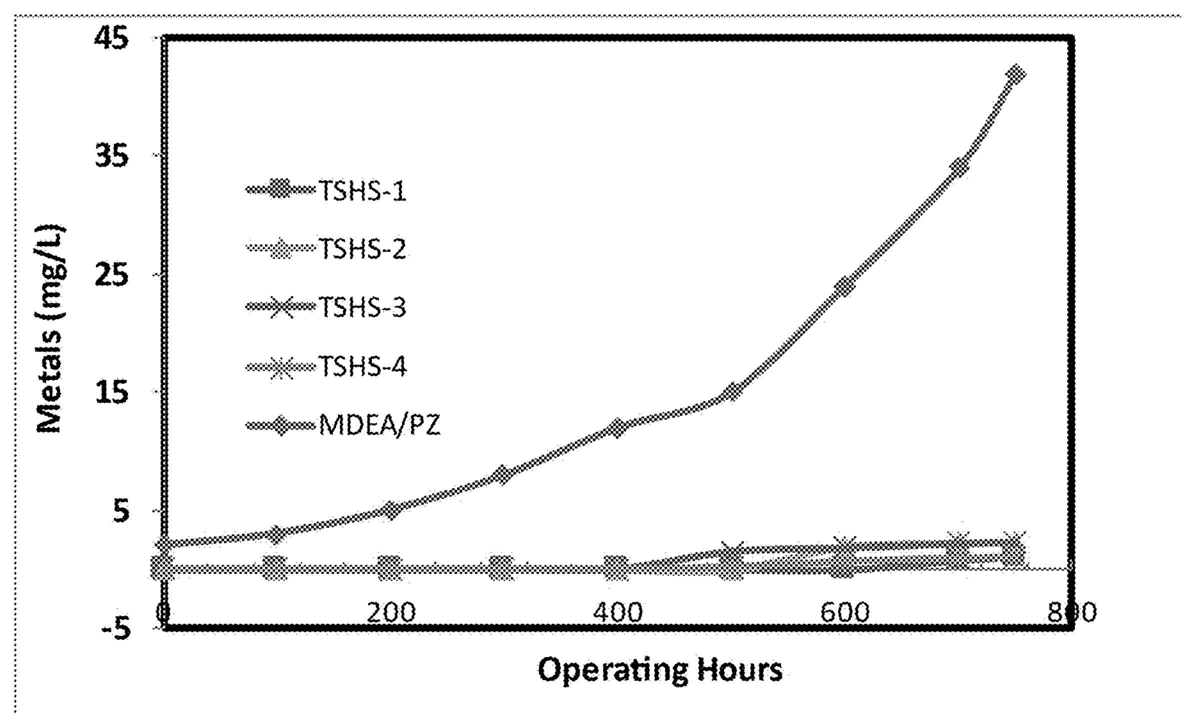
FIG. 1 illustrates corrosion behaviour of the bio amine cluster from the metal leaching of the container material.

For the purpose of promoting an understanding of the principles of the invention, reference will now be made to the embodiments illustrated in the figures and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

The articles "a", "an" and "the" are used to refer to one or to more than one (i.e., to at least one) of the grammatical object of the article. The terms "comprise" and "comprising" are used in the inclusive, open sense, meaning that additional elements may be included. It is not intended to be construed as "consists of only". Throughout this specification, unless the context requires otherwise the word "comprise", and variations such as "comprises" and "comprising", will be understood to imply the inclusion of a stated element or step or group of elements or steps but not the exclusion of any other element or step or group of elements or steps.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference. The present disclosure is not to be limited in scope by the specific examples described herein, which are intended for the purposes of exemplification only. Functionally—equivalent products and methods are clearly within the scope of the disclosure, as described herein.

The terminology and structure employed herein is for describing, teaching and illuminating some embodiments and their specific features and elements and does not limit, restrict or reduce the spirit and scope of the invention.

In an aspect of the present invention, this disclosure provides a biocompatible task specific hybrid solvent (TSHS) composition for selective capturing of $CO_2$ from gaseous stream, wherein said composition comprising:

(a) an organic component; and (b) an inorganic component, wherein said solvent composition increases carbon capture efficiency, utilizes less energy for low temperatures $CO_2$ desorption, improves cyclic capacity, lowers corrosion and viscosity alteration.

In an embodiment, said organic component comprises at least one $C_2$-$C_{10}$ alkanolamine or hindered amine, at least one $C_8$-$C_{10}$ hindered aromatic amines, at least one intermediate stabilizer, at least one-prolinate derivatives and at least one-glycol derivatives.

In another embodiment, said inorganic component comprises at least one colloidal covalent metal organic (CCMO) compound, at least one rough surfaced basic nano particle and at least one gas to liquid shuttle nano composite.

In an embodiment, the present invention provides a biocompatible task specific hybrid solvent (TSHS) composition for selective capturing of $CO_2$ from gaseous stream, wherein said composition comprising:

(a) an organic component comprising at least one-prolinate derivatives; and (b) an inorganic component, wherein said solvent composition increases carbon capture efficiency, utilizes less energy for low temperatures $CO_2$ desorption, improves cyclic capacity, lowers corrosion and viscosity alteration.

In the above embodiment, said organic component comprises at least one $C_2$-$C_{10}$ alkanolamine or hindered amine, at least one $C_8$-$C_{10}$ hindered aromatic amines, at least one intermediate stabilizer and at least one-glycol derivatives; and said inorganic component comprises at least one colloidal covalent metal organic (CCMO) compound, at least one rough surfaced basic nano particle and at least one gas to liquid shuttle nano composite.

In another embodiment, the present invention provides a biocompatible task specific hybrid solvent (TSHS) composition for selective capturing of $CO_2$ from gaseous stream, wherein said composition comprising:

(a) an organic component comprising at least one C2-C10 alkanolamine or hindered amine, at least one C8-C10 hindered aromatic amines, at least one intermediate stabilizer, at least one-prolinate derivatives and at least one-glycol derivatives; and (b) an inorganic component inorganic component comprises at least one colloidal covalent metal organic (CCMO) compound, at least one rough surfaced basic nano particle and at least one gas to liquid shuttle nano composite;

wherein said solvent composition increases carbon capture efficiency, utilizes less energy for low temperatures $CO_2$ desorption, improves cyclic capacity, lowers corrosion and viscosity alteration.

In yet another embodiment, the $C_2$-$C_{10}$ alkanolamine or hindered amine solvents are selected from Isobutyl amine, 2-amino-2-methyl-ipropanol, 2-(2-aminoethylamino)ethanol, 2-amino-2-hydroxymethyl-i,3-propanediol, N-methyldiethanolamine, dimethylmonoethanolamine, diethylmonoethanolamine, triisopropanolamine and triethanolamine), trimethylamine, triethylamine, tripropylamine, tributylamine, dimethylethylamine, dimethylpropylamine, dimethylbutylamine, diethylmethylamine, diethylpropylamine, diethylbutylamine, N,N-diisopropylmethylamine, N-ethyldiisopropylamine, N,N-dimethylethylamine, N,N-diethylbutylamine, 1,2-dimethylpropylamine, N,N-diethylmethylamine, N,N-dimethylisopropylamine, 1,3-dimethylbutylamine, 3,3-dimethylbutylamine, N,N-dimethylbutylamine and mixture thereof.

In an embodiment, alkanolamine or hindered amine has concentration in the range of 10 to 30 wt % in TSHS and said concentration depends on the feed gas $CO_2$ concentration.

In another embodiment, said hindered aromatic amines are selected from 2,4-Diaminotoluene, 2,4-diaminoethylbenzene, 2-Naphthylamine, 1-Naphthylamine, NPhenyl·2·naphthylamine, N-hydroxy-lnaphthylamine, N-hydroxy-2-naphthylamine, 1-Amino-2-naphthyl sulfate, 1-Amino-4-naphthyl sulfate, 1-Amino-2-naphthy 1 glucuronide, 1-Amino-4-naphthyl glucuronide, 4-Aminobiphenyl, N-hydroxy-4-aminobiphenyl, methyl (tri-o-acety-d-Dglucopyranosyl bromide), N,4-biphenyl-N-hydroxy-,B-glucuroniosylamine, Benzidine, 3,3'-Dichlorobenzidine, 4-Amino-2-nitrophenol, 1,2-diamino-4-nitrobenzene, and 1,4-diamino-2-nitrobenzene, 4,4'-Methylenedianiline (MDA), 4,4'-M ethylene-bis-(2-chloroaniline), 2,2'-bis (4-Aminophenyl) propane, 4,4'-Imidocarbonyl-bis (N,N'-Dimethyl) Aniline.

In one more embodiment, the hindered aromatic amines have concentration in the range of 2 to 10-wt % in TSHS and said concentration depends on the feed gas $CO_2$ concentration.

In yet another embodiment, the ratio of $C_2$-$C_{10}$ alkanolamine or hindered amine solvents and $C_8$-$C_{16}$ hindered aromatic amines is 5:1; and the total concentration of the mixture is at 10-30 wt %.

In an embodiment, Prolinate derivatives are selected from 2-pyrrolidinecarboxylate, decyl 5-oxo-L-prolinate, Methyl (4S)-4-amino-1-methyl-L-prolinate dihydrochloride, Methyl Prolinate, 2,3-Dihydroxypropyl 5-oxo-L-prolinate, ethyl L-prolinate, tert-Butyl L-prolinate, Methyl 1-benzoyl-5-thioxo-L-prolinate, Benzhydryl 5-oxo-L-prolinate, Methyl 1-benzyl-L-prolinate, 3-(4-Fluorophenyl)propyl 1-{[(1R)-1-phenylethyl]carbamoyl}-L-prolinate or mixture thereof.

In another embodiment, the concentration of Prolinate derivatives ranges between 100-300 ppm.

In yet another embodiment, said reaction intermediate stabilizer comprise of alkyne-terminated Dendrons, Polyester bis-MPA Dendron (Bis-MPA: 2,2-Bis(hydroxymethyl) propionic acid), Poly(ethylene glycol) linear dendrimer, Amine-terminated PEG-core Dendrimers, Poly(ethylene glycol) linear dendrimer, Hyperbranched PEG Dendrimers, Hyperbranched PEG Dendrimers, Hyperbranched Polymers, PAMAM Dendrimers, PEG-core Dendrimers, Phosphorous Dendrimers, Polypropylenimine Dendrimers.

In one more embodiment, said reaction intermediate stabilizer has concentration between 20-50 ppm.

In an embodiment, said glycol derivatives are selected from Tetraethyleneglycol monododecyl ether, Polyethylene glycol monolaurate, Poly(ethylene glycol) dimethacrylate, Methoxypolyethylene glycols, Poly(ethylene glycol), Poly (ethylene glycol) diacrylate, Polyethylene glycol dimethyl ether, hexaethylene glycol monomethyl ether, diethylene glycol monolaurate, octaethylene glycol monomethyl ether, Tetraethyleneglycol monooctyl ether, poly(ethylene glycol) divinyl ether, Allyloxypolyethyleneglycol, diethylene glycol diglycidyl ether, and tetraethyleneglycol monodecyl ether.

In another embodiment, said glycol derivatives have concentration between 1-2 wt %.

In yet another embodiment, said Colloidal covalent metal-organic (CCMO) components are selected from zeolitic imidazolate framework-8, MOF-5 [$Zn_4O$(terephthalate)$_3$, [Zn(mim)2] (ZIF-8; mim=2-methylimidazolate), [$Cu_3$-(btc)$_2$] crystals (HKUST-1; btc=benzene-1,3,5-tricarboxylate), [$Cu_2$(ndc)$_2$(dabco)$_2$] (ndc=1,4-naphthalene dicarboxylate; dabco=1,4-diazabicyclo-[2.2.2] octane), hydrophobic ZIF-8, f UiO-66, MOF-177.

In one more embodiment, the metal is selected from Zn, Cu, Ni, Cd or Ln.

In an embodiment, the CCMOs have a concentration between 300-500 ppm.

In another embodiment, the rough surfaced basic nanoparticle is selected from a surface modified alkaline nano particle, calcium hydroxide nanoparticles, CaO nano particles, amine functionalized silica nano particle, amine-functionalized $MgFe_2O_4$, Amine-Functionalized $Fe_2O_3$—$SiO_2$ Core-Shell Nanoparticles, pNTA-functionalized nanoparticles, amine functionalized $TiO_2$ nanoparticles along with alkaline nano particles.

In yet another embodiment, said particles have an alkaline core consisting of a substance selected from the group: calcium hydroxide, magnesium hydroxide, magnesium carbonate, calcium carbonate, magnesium bis(hexamethyldisilazide), calcium bis(hexamethyldisilazide), calcium acetylacetonate hydrate, calcium 2,2,6,6,-tetramethyl-3,5-heptanedionate (Ca(TMHD)2) or mixtures thereof and optionally a hydrophilic cellulose derivative and a stabilizing outer layer containing at least a stabilizer selected from the group: silylated hydrophobic polysaccharides, hydrophobic polysaccharides, poly(dimethylsiloxane) diglycidyl ether terminated and poly(dimethylsiloxane)aminopropyl terminated.

In one more embodiment, the surfaces of the core particles are coated or covered with a polymer network so that the covered or coated particles are stable over the time in a dispersion formed thereof.

In an embodiment, said nanoparticles have the concentration between 100 to 150 ppm.

In another embodiment, said Gas-liquid shuttle nano composite is composed on one of more of the nano particles selected from $SiO_2$, $Al_2O_3$, and $TiO_2$, $Al_2O_3$, $TiCl_2$/Nano-$\gamma$-$Al_2O_3$, $CoFe_2O_4$, magnetic $Fe_3O_4$, $Ga_2O_3$, functional silica, colloidal $In_2O_3$, ZnO, CoO, $MnO_2$, $Fe_3O_4$, PbS, $MFe_2O_4$ (M=Fe, Co, Mn, Zn), Lewis acid $ZrO_2$, silica boron sulfuric acid nanoparticles, Ni metal nanoparticles loaded on the acid-base bifunctional support ($Al_2O_3$), $Co_3O_4$ nanoparticles.

In yet another embodiment, the amount of Gas-liquid shuttle ranges between 50-100 ppm.

In a second aspect of the invention, the present disclosure provides a process of preparing the biocompatible task specific hybrid solvent (TSHS) composition as claimed in claim 1, wherein said process comprises the steps of:

- preparing a base amine solution by mixing $C_2$-$C_{10}$ alkanolamine or hindered amine and $C_8$-$C_{10}$ hindered aromatic amines in the ratio of 5:1;
- adding at least one prolinate derivative to the base amine solution at the rate of 0.2-0.5 ml/min.;
- adding at least one intermediate stabilizer to the solution of prolinate and amines;
- synthesizing a colloidal covalent metal-organic (CCMO) compound and adding the same to the solution of intermediate stabilizer, prolinate and amines at the rate of 2-10 ml/min.;
- preparing the surface modified alkaline nanoparticle and gas-liquid shuttle nanocomposite;
- adding the surface modified alkaline nanoparticle and gas-liquid shuttle nanocomposite at an intermittent dosing rate of 0.4 ml-0.6 ml/min to at least one glycol derivative to obtain a homogenous colloidal solution;
- adding the colloidal solution to the solution of CCMO and other components;
- making up the volume with DI water and incubating the whole solution at 55° C. for 4 hours to obtain the TSHS system.

In an embodiment, controlling of said dosing of gas-liquid shuttle nanocomposite leads to a decrease in loading of $H_2S/SO_x/NO_x$ and enhancement in the $CO_2$ capture.

In a third aspect of the invention, the present disclosure provides a process for $CO_2$ capture or recovery, wherein said process comprises the steps of:

- providing a $CO_2$ source which is selected from carbon dioxide-containing flue gas, or process gas or gas from bio-methanation plants having $CO_2$ concentration ranging from 200 ppm to 900000 ppm in the source gas;
- passing the $CO_2$ containing gas through the solvent composition as defined in in the present invention in a device to form a fine dispersion of gas which results in an increase in contact area, sparging the carbon dioxide as a micro-bubble or a nanobubble;
- carrying out $CO_2$ desorption by thermal or solar assisted electro desalination method and amine regeneration by thermal, ultra-sonication and microwave irradiation.

In an embodiment, the pressure of $CO_2$ containing gas ranges from 0.1 bar to 10 bar and temperature ranges between 20-70° C.

In another embodiment, the regeneration step is performed at temperature ranging from 85-100° C.

Having described the basic aspects of the present invention, the following non-limiting examples illustrate specific embodiment thereof.

EXAMPLES

Example 1: Synthesis of TSHS-1 Solvent a) To synthesize TSHS (1 L) first the base solvent was prepared by mixing 240 g of 2-amino-2-methyl-ipropanol and 60 g of 2, 4-diaminoethylbenzene was properly mixed for 4 h at room temperature.

b) In another vial 100 mg of methyl prolinate was dissolved in 5 ml of DI, The solution was added to the mixed amine prepared in 'step-a' at a rate of 0.2 ml/min with constant stirring at 230 rpm followed by addition of Poly(ethylene glycol) linear dendrimer (30 mg) drop wise. The resulting solution was stored at 30° C.

c) Synthesis of colloidal Zn-covalent metal-organic compound: A stock solution of Zinc chloride was prepared by dissolving Zinc chloride (0.9 mmol) in 30 mL of N, N Dimethylformamide (DMF). A second stock solution comprised of terephthalic acid (3.01 mmol) in 10 mL of DMF was prepared. Zinc chloride stock solution (3 mL) was added to terephthalic acid stock solution (1 mL), 20 mg F-127, and 10 mg poly(ethylene) glycol in a 10 mL vial. 1.5 M for acetic acid added drop wise to the above solution. The solution was heated at 90° C. for 18 h to yield colloidal Zn-covalent metal-organic framework. The solution was centrifuged at 10,000 rpm and the solid was dried at 55° C. overnight.

d) 300 mg of the colloidal Zn-covalent metal-organic compound (dried) was dispersed in 25 ml of DI, and sonicated for 5 min. The well-dispersed colloidal Zn-covalent metal-organic compound is added to the solution obtained in 'step c' with a rate of 2-3 ml per min with constant stirring. A pale white solution obtained and was stored at 30° C.

e) Synthesis of surface modified alkaline nano particle: 3 g of calcium hydroxide (Ca $(OH)_2$) was dissolved in 12.5 ml of ethylene glycol and stirred vigorously and then 1 g of sodium hydroxide (NaOH) was added into the mixture. The solution was left to settle down for 5 hours after 10 minutes of sonication. The precipitate was filtered and obtained precipitate has been repeatedly washed with deionized water for 5 times and then dried at in 100° C., subsequently. Finally, calcium oxide nanoparticles of different size were obtained by calcining at 800° C.

f) Gas-liquid shuttle nano composite: Deionized water (200 mL) was added to a 500 mL flask and heated to 100° C. Then, after adding $ZnCl_2$ (250 mmol), the mixture was agitated using a magnetic bar to prepare a precursor solution. After $ZnCl_2$ was completely dissolved, 3 g of sodium hydroxide pellets were added at once and a dispersion of ZnO nanoparticles was prepared by agitating at 100 rpm using a magnetic bar. ZnO nanoparticles were produced as white precipitate. The reaction was terminated in 10 minutes. During the preparation of the precursor solution and the addition of the sodium hydroxide pellets, the temperature was maintained at 100° C. After the reaction was terminated, the dispersion of ZnO nanoparticles was cooled to room temperature and ZnO nanoparticles were recovered by centrifuge at 10,000 rpm.

g) In 50 ml of DI, 10 g of Poly (ethylene glycol) was added and stirred for 1 h. During stirring 100 mg of surface modified alkaline CaO particle and 50 mg of Gas-liquid shuttle nano composite (ZnO) was added. The mixture was then sonicated for 30 min intermittently to obtain a homogeneous colloidal solution.

h) The solution obtained in 'step g' was added to the solution obtained in 'step d' at a dosing rate of 0.2 ml per min with constant stirring. After complete addition, the volume of final solution was made to 1 L using DI to obtained TSHS-1.

Example 2: Synthesis of TSHS-2, 3 & 4 Solvents

Three other solvent systems were synthesized in the similar way as for TSHS-1 in Example 1 above, having the following composition as given in Table-2. The concentration, rate of addition and condition are similar for all the synthesized solvent.

TABLE 2

Preparation of TSHS solvent system with various composition

| Solvent | TSHS-1 | TSHS-2 | TSHS-3 | TSHS-4 |
|---|---|---|---|---|
| Alkanolamine or hindered amine | 2-amino-2-methylipropanol | 2-amino-2-methylipropanol | 2-amino-2-methylipropanol | 2-amino-2-methylipropanol |
| Hindered aromatic amines | 2,4-diaminoethylbenzene | 2,4-diaminoethylbenzene | 2,4-diaminoethylbenzene | 2,4-diaminoethylbenzene |
| Prolinate derivatives | Methyl Prolinate | tert-Butyl L-prolinate | tert-Butyl L-prolinate | Methyl Prolinate |
| Intermediate stabilizer | Poly(ethylene glycol) linear dendrimer | Amine-terminated PEG-core Dendrimers | Polypropylenimine Dendrimers | Polypropylenimine Dendrimers |
| Glycol derivatives | Poly(ethylene glycol) | Poly(ethylene glycol) | Poly(ethylene glycol) | Poly(ethylene glycol) |
| CCMO | Zn-CCMO | Zr-CCMO | Ni-CCMO | Zn-CCMO |
| Surface modified alkaline nano particle | CaO | MgO | $CaCO_3$ | $MgCO_3$ |
| GL shuttle nano composite | ZnO | $Fe_2O_3$ | $Al_2O_3$ | $TiO_2$ |

Example 3: Characterization of TSHS Solvent and Methods of Measurement

1. Carbon Dioxide Absorption by Gravimetric Analysis

Gravimetric analysis: For $CO_2$ absorption measurements (time-dependent $CO_2$ uptakes of TSHS) of the TSHS, $CO_2$ gas was flown into a reactor (100 mL) containing 20 g of solvent at a flow rate of 20 mL min-1. The weight percent of $CO_2$ absorbed was determined by weighing the solvent at a regular interval using an electronic balance with an accuracy of ±0.1 mg.

2. $CO_2$ Solubility Analysis Continuous Flow Bubbling Reactor $CO_2$ solubility was measured using a continuous flow bubbling reactor (CFBR). The CFBR can be operated in various pressure modes. Gas cylinders with different $CO_2$ mole fractions from 400 ppm to 90% were connected to the feed line of the reactor through individual mass flow controllers. A glass vessel with a solvent capacity of 50 mL was used as the reactor. The reactor temperature was maintained constant using water circulating between the reactor jacket and the heating bath. Because of negligible pressure drop in the tubing and peripherals, the reactor pressure was assumed equal to the atmospheric pressure measured. A $N_2$ and $CO_2$ mixed gas was purged through a glass bubbler into the solvent at a flow rate of 1 standard liter per minute (SLM). The gas discharged from the reactor passes through a condenser to recover water and amine vapor, and then passes through a desiccant unit ($CaCl_2$) column) to completely remove moisture. The concentration of outlet $CO_2$ was measured by online GC (Inficon).

3. Experimental Condition

In each experiment, the reactor is charged with required amount of the absorbent. The gas inside the reactor is then purged with $N_2$ to ensure an inert atmosphere. Thereafter, N; is released through the gas outlet port. All the lines are closed and the reactor content attained the desired temperature. The reactor is then stirred at $CO_2$ from the gas cylinder is then charged inside the considered as the starting point for the reaction. The reactor content is the desired speed of agitation. The pressure transducer monitors the decrease in system pressure due to reaction and the data are recorded for 60 seconds. These data are plotted between $pCO_2$ and t and fitted to a third degree polynomial using the least-square regression. The absorption rates are calculated from the values of the slope $dP_{co2}/t$.

4. $CO_2$ Mass Transfer Measurement

The mass transfer efficiency of a solvent can be measured in the laboratory using a wetted wall column apparatus that is designed to mimic the gas-liquid contact occurring in typical packed absorption columns. The apparatus operates by counter-currently contacting an amine liquid which is flowing down over an absorption column with a gas stream travelling upwards and adjacent to the liquid before exhausting at the top. Such measurements combine the processes of $CO_2$ diffusion across the gas-liquid interface, and chemical reaction within the amine liquid acting to consume $CO_2$, resulting in overall mass transfer coefficients for $CO_2$ absorption in each of the amine solutions over a range of $CO_2$ loading conditions. The absorption of $CO_2$ into with various TSHS was performed here at 40° C.

5. Thermal Degradation

Tightly sealed tube reactors made of Teflon coated stainless steel was used to investigate the solvent thermal degradation at high temperature. After the solvent with rich $CO_2$ loading was charged and a carbon steel specimen was inserted, the reactor was placed in an oven at 120° C. Thermal degradation was analyzed for desired days. The solvents were analyzed by chromatography and the degree of thermal degeneration was expressed by the change in peak area.

Example 4: Results and Discussion

1. Measurement of Physical Properties of TSHS

| T (° C.) | Solvent system | Density (Kg/m$^3$) | Viscosity (mPa · s) |
|---|---|---|---|
| 25 | TSHS-1 | 1135.2 | 1.56 |
| | TSHS-2 | 1256.2 | 1.51 |
| | TSHS-3 | 1025.3 | 1.63 |
| | TSHS-4 | 1226.8 | 1.25 |
| 30 | TSHS-1 | 1133.9 | 1.32 |
| | TSHS-2 | 1255.7 | 1.40 |
| | TSHS-3 | 1024.8 | 1.45 |
| | TSHS-4 | 1224.7 | 1.13 |
| 40 | TSHS-1 | 1131.5 | 1.15 |
| | TSHS-2 | 1254.7 | 1.29 |
| | TSHS-3 | 1023.2 | 1.22 |
| | TSHS-4 | 1223.3 | 1.08 |

2. Kinetic Study of $CO_2$ Absorption:

| T (° C.) | Solvent system | Rate constant (s$^{-1}$) |
|---|---|---|
| 25 | TSHS-1 | 36524 |
| | TSHS-2 | 22685 |
| | TSHS-3 | 26354 |
| | TSHS-4 | 35698 |
| 30 | TSHS-1 | 48558 |
| | TSHS-2 | 32554 |
| | TSHS-3 | 33022 |
| | TSHS-4 | 39665 |
| 40 | TSHS-1 | 50248 |
| | TSHS-2 | 42115 |
| | TSHS-3 | 43012 |
| | TSHS-4 | 42356 |

A large value of the rate constant means that the reaction is relatively fast for $CO_2$ capture.

3. Effect of $CO_2$ Partial Pressure

| | $CO_2$ partial pressure | | | |
|---|---|---|---|---|
| Solvent | 10 kPa | 5 Kpa | 3 Kpa | 1 Kpa |
| TSHS-1 | 6.11 | 5.96 | 5.84 | 5.72 |
| TSHS-2 | 5.91 | 5.66 | 5.53 | 5.45 |
| TSHS-3 | 5.81 | 5.62 | 5.33 | 5.05 |
| TSHS-4 | 5.64 | 5.22 | 5.01 | 4.8 |

4. Gravimetric $CO_2$ Loading

The time-dependent $CO_2$ uptakes of TSHS-1 and other components were measured at 30° C. and 1 atm pressure using the gravimetric method.

| Code | Components | CO2 loading (Mol/L) |
|---|---|---|
| A | 2-amino-2-methyl-ipropanol | 1.4 |
| B | 2,4-diaminoethylbenzene | 1.1 |
| C | Poly(ethylene glycol) linear dendrimer | ND |
| D | Methyl Prolinate | 0.04 |
| E | Zn-covalent metal-organic compound | 0.6 |
| F | Modified CaO nano particle + ZnO | 0.08 |
| | Gas-liquid shuttle nano composite in PEG | |
| | A + B | 2.48 |
| | A + C | 1.94 |
| | A + D | 1.54 |
| | A + E | 1.28 |
| | A + F | 1.33 |

-continued

| Code | Components | CO2 loading (Mol/L) |
|---|---|---|
| | B + C | 2.17 |
| | B + D | 1.88 |
| | B + E | 2.25 |
| | B + F | 1.92 |
| | C + D | 0.03 |
| | D + E | 0.62 |
| | E + F | 0.59 |
| | A + B + C | 2.22 |
| | A + B + D | 2.29 |
| | A + B + E | 2.24 |
| | A + B + F | 2.23 |
| | B + C + D | 1.92 |
| | B + C + E | 1.99 |
| | B + C + F | 1.96 |
| | C + D + E | 0.59 |
| | C + D + F | 0.66 |
| | A + B + C + D | 2.96 |
| | A + B + C + E | 2.86 |
| | A + B + C + F | 1.91 |
| | B + C + D + F | 1.31 |
| | A + B + C + D + E + F | 5.87 |

5. Cyclic Capacities of Amines

Cyclic capacity refers to the difference between lean and rich loading of a solvent. In this study, the lean loading was defined as $CO_2$ loading corresponding to $CO_2$ at equilibrium partial pressure of 0.05 kPa at 90° C. whereas the rich loading was defined as the loading values corresponding to $CO_2$ EPP of 0.05 kPa.

| Solvent | Lean loading (mol CO2/kg-solv) | Rich loading (molCO2/kg-solv) | Cyclic capacity (mol CO2/kg-solv) |
|---|---|---|---|
| MEA | 1.68 | 2.52 | 0.84 |
| TSHS-1 | 0.15 | 5.87 | 5.72 |
| TSHS-2 | 0.21 | 5.66 | 5.45 |
| TSHS-3 | 0.32 | 5.37 | 5.05 |
| TSHS-4 | 0.23 | 5.03 | 4.8 |

6. Thermal Degradation: Solvents were in the Rich-Loaded States at 100° C.

| Solvent | % of degradation |
|---|---|
| MEA | 21 |
| TSHS-1 | 0.94 |
| TSHS-2 | 0.55 |
| TSHS-3 | 0.78 |
| TSHS-4 | 0.96 |

7. Stability of TSHS in Operation Condition (a) The corrosion behaviour of the bio amine cluster has been observed from the metal leaching of the container material. Experiments were performed for a continuous 750 h and the total metal contents were analyzed by ICPAES. It has been found that for MDEA/PZ, and then there was a leaching of 42 ppm of metal after 750 h of operation, whereas in TSHS-1, only 0-1.9-ppm metal was leached. This clearly indicates that TSHS showed very low corrosion activity (FIG. 1).

(b) The viscosity of the TSHS was measured for 30 numbers of consecutive absorption, desorption cycles, and compared with that of MDEA/PZ. It has been observed that the viscosity of MDEA/PZ increases after each absorption and desorption cycles and reaches to 38 eta/mPa·s, whereas the viscosity of IB-PEGD-Cl/AMEO/CA remains almost constant after 30 cycles of operation.

| Solvent | Viscosity (mPas) at 30° C. (fresh solvent) | Viscosity (mPas) at 30° C. ($30^{th}$ cycle) |
|---|---|---|
| TSHS-1 | 1.32 | 1.53 |
| TSHS-2 | 1.40 | 1.52 |
| TSHS-3 | 1.45 | 1.66 |
| TSHS-4 | 1.13 | 1.73 |

(c) Overall Mass Transfer Coefficients

Figure 2:
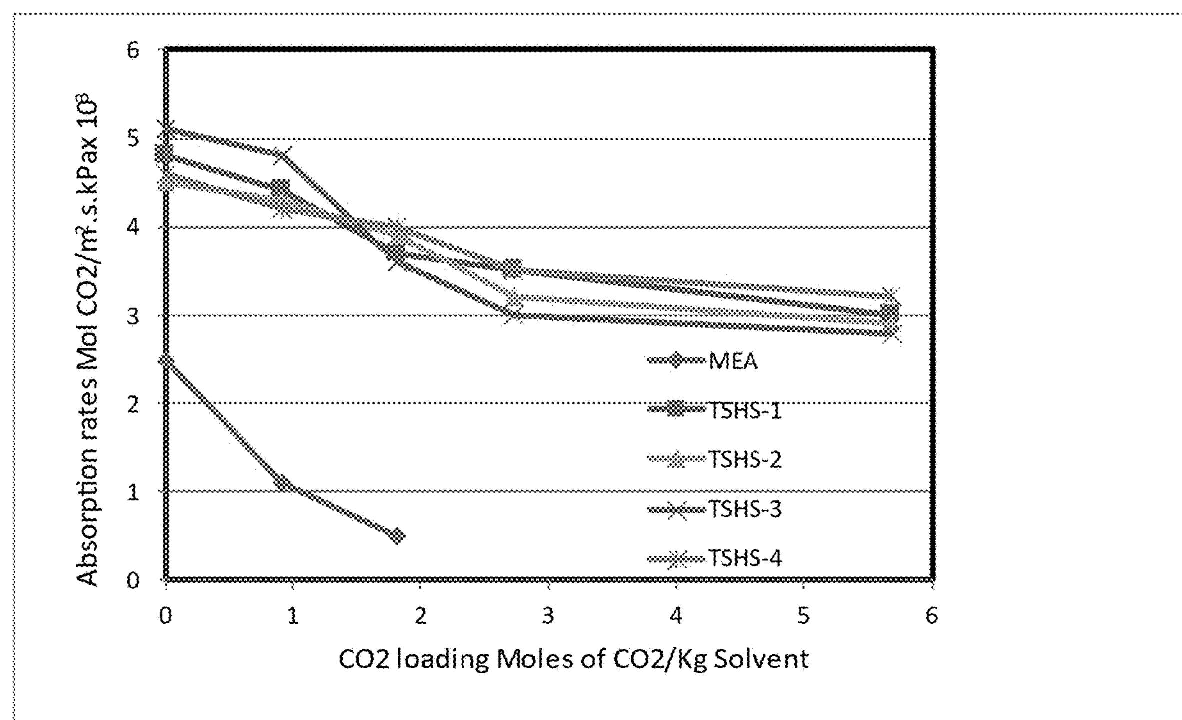
FIG. 2 illustrates overall mass transfer coefficients.

From the mass transfer coefficients in the reactivity of the amines follows the trend TSHS-1 to 4 >MEA. In all cases here, $CO_2$ mass transfer decreases linearly with increasing $CO_2$ loading, which is in line with the supposition of a depletion of the bulk concentration of free "reactive" amine as $CO_2$ loading increases, and increases in solution viscosity due to the increasing amount, and interactions, of charged species (carbonate, bicarbonate, protonated amine, carbamate etc) in the solution. The data (FIG. 2) demonstrate mass transfer rates up to 2 times higher than MEA the entire loading range. Importantly, mass transfer above diffusion is maintained in TSHS up to a loading of 5 mol $CO_2$/Kg of solvent, improving the overall working range of the solvent.

Technical Advantages of the Invention

The present invention has the following advantage over the prior arts:

1) Task specific hybrid solvent (TSHS) composition provides a faster and higher $CO_2$ loading ability from a mixture of gases and also displays low vapor pressure.
2) TSHS composition further lower viscosity over commercially available solvents after $CO_2$ capture and display low corrosive property.
3) High stability against thermal and oxidative degradation and allows higher desorption at low temperature.
4) Improved cyclic capacity compared to conventional amines over a similar temperature swing.

It will thus be seen that the objects set forth above, among those made apparent from the preceding description, are efficiently attained, and since certain changes may be made in the constructions set forth without departing from the spirit and scope of the invention, it is intended that all matter contained in the above description shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. These and other modifications of the preferred embodiments as well as other embodiments of the invention will be obvious from the disclosure herein, whereby the foregoing descriptive matter is to be interpreted merely as illustrative of the invention and not as a limitation.

Finally, to the extent necessary to understand or complete the disclosure of the present invention, all publications, patents, and patent applications mentioned herein are expressly incorporated by reference therein to the same extent as though each were individually so incorporated.

The invention claimed is:

1. A biocompatible task specific hybrid solvent (TSHS) composition for selective capturing of $CO_2$ from a gaseous stream, the composition comprising:

(a) an organic component comprising at least one $C_2$-$C_{10}$ alkanolamine or a hindered amine, at least one $C_8$-$C_{10}$ hindered aromatic amine, at least one intermediate stabilizer, at least one-prolinate derivative and at least one-glycol derivative; and an inorganic component comprising at least one colloidal covalent metal organic (CCMO) compound, at least one rough surfaced basic nanoparticle and at least one gas to liquid shuttle nano composite.

2. The biocompatible task specific hybrid solvent (TSHS) composition as claimed in claim 1; and wherein the alkanolamine or the hindered amine has a concentration in a range of 10 to 30 wt % in TSHS.

3. The biocompatible task specific hybrid solvent (TSHS) composition as claimed in claim 1, wherein the CCMO compound is selected from the group consisting of a zeolitic imidazolate framework-8, MOF-5 having structure as [$Zn_4O$ (terephthalate)3], ZIF-8 having structure as [$Zn(mim)_2$] (wherein mim is 2-methylimidazolate), HKUST-1 having structure as [$Cu_3$-$(btc)_2$] (wherein btc is benzene-1,3,5-tricarboxylate), [$Cu_2(ndc)_2(dabco)_2$] (Wherein ndc is 1,4-naphthalene dicarboxylate; dabco is 1,4-diazabicyclo-[2.2.2] octane), hydrophobic ZIF-8, functionalized UiO-66 having structure as Zr (1,4-dicarboxybenzene), MOF-177 having formula $C_{54}H_{30}O_{13}Zn_4$.

4. The biocompatible task specific hybrid solvent (TSHS) composition as claimed in claim 1, wherein the $C_2$-$C_{10}$ alkanolamine or the hindered amine solvents are selected from the group consisting of Isobutyl amine, 2-amino-2-methyl-ipropanol, 2-(2-aminoethylamino)ethanol, 2-amino-2-hydroxymethyl-i,3-propanediol, N-methyldiethanolamine, dimethylmonoethanolamine, diethylmonoethanolamine, triisopropanolamine and triethanolamine), trimethylamine, triethylamine, tripropylamine, tributylamine, dimethylethylamine, dimethylpropylamine, dimethylbutylamine, diethylmethylamine, diethylpropylamine, diethylbutylamine, N,N-diisopropylmethylamine, N-ethyldiisopropylamine, N,N-dimethylethylamine, N,N-diethylbutylamine, 1,2-dimethylpropylamine, N,N-diethylmethylamine, N,N-dimethylisopropylamine, 1,3-dimethylbutylamine, 3, 3-dimethylbutylamine, N,N-dimethylbutylamine and a mixture thereof.

5. The biocompatible task specific hybrid solvent (TSHS) composition as claimed in claim 1, wherein the hindered aromatic amines are selected from the group consisting of 2,4-Diaminotoluene, 2,4-diaminoethylbenzene, 2-Naphthylamine, 1-Naphthyl amine, NPhenyl·2·naphthylamine, N-hydroxy-lnaphthylamine, N-hydroxy-2-naphthylamine, 1-Amino-2-naphthyl sulfate, 1-Amino-4-naphthyl sulfate, 1-Amino-2-naphthy 1 glucuronide, 1-Amino-4-naphthyl glucuronide, 4-Aminobiphenyl, N-hydroxy-4-aminobiphenyl, methyl (tri-o-acety-d-Dglucopyranosyl bromide), N,4-biphenyl-N-hydroxy-,B-glucuroniosylamine, Benzidine, 3,3'-Dichlorobenzidine, 4-Amino-2-nitrophenol, 1,2-diamino-4-nitrobenzene, and 1,4-diamino-2-nitrobenzene, 4,4'-Methylenedianiline (MDA), 4,4'-M ethylene-bis-(2-chloroaniline), 2,2'-bis (4-Aminophenyl) propane, and 4,4'-Imidocarbonyl-bis (N,N'-Dimethyl) Aniline.

6. The biocompatible task specific hybrid solvent (TSHS) composition as claimed in claim 1, wherein the hindered aromatic amines have a concentration in a range of 2 to 10-wt % in TSHS, wherein the concentration depends on the $CO_2$ concentration in the gaseous stream; wherein $C_2$-$C_{10}$ alkanolamine or hindered amine solvents and $C_8$-$C_{16}$ hindered aromatic amines are in a ratio of 5:1; and wherein total concentration of $C_2$-$C_{10}$ alkanolamine or hindered amine solvents and $C_8$-$C_{16}$ hindered aromatic amines is at 10-30 wt % in TSHS.

7. The biocompatible task specific hybrid solvent (TSHS) composition as claimed in claim 1, wherein prolinate derivatives are selected from the group consisting of 2-pyrrolidinecarboxylate, decyl 5-oxo-L-prolinate, Methyl (4S)-4-amino-1-methyl-L-prolinate dihydrochloride, Methyl prolinate, 2,3-Dihydroxypropyl 5-oxo-L-prolinate, ethyl L-prolinate, tert-Butyl L-prolinate, Methyl 1-benzoyl-5-thioxo-L-prolinate, Benzhydryl 5-oxo-L-prolinate, Methyl 1-benzyl-L-prolinate, 3-(4-Fluorophenyl)propyl 1-{[(1R)-1-phenylethyl]carbamoyl}-L-prolinate and a mixture thereof; and wherein a concentration of prolinate derivatives ranges between 100-300 ppm of TSHS.

8. The biocompatible task specific hybrid solvent (TSHS) composition as claimed in claim 1, wherein the reaction intermediate stabilizer comprises alkyne-terminated dendrons, Polyester bis-MPA dendron (Bis-MPA: 2,2-Bis(hydroxymethyl)propionic acid), Poly(ethylene glycol) linear dendrimer, Amine-terminated PEG-core dendrimers, Poly (ethylene glycol) linear dendrimer, Hyperbranched PEG dendrimers, hyperbranched polymers, PAMAM dendrimers, PEG-core dendrimers, phosphorous dendrimers, polypropylenimine dendrimers; and wherein the reaction intermediate stabilizer has a concentration between 20-50 ppm of TSHS.

9. The biocompatible task specific hybrid solvent (TSHS) composition as claimed in claim 1, wherein the glycol derivatives are selected from the group consisting of Tetraethyleneglycol monododecyl ether, Polyethylene glycol monolaurate, Poly(ethylene glycol) dimethacrylate, Methoxypolyethylene glycols, Poly(ethylene glycol), Poly (ethylene glycol) diacrylate, Polyethylene glycol dimethyl ether, hexaethylene glycol monomethyl ether, diethylene glycol monolaurate, octaethylene glycol monomethyl ether, Tetraethyleneglycol monooctyl ether, poly(ethylene glycol) divinyl ether, Allyloxypolyethyleneglycol, diethylene glycol diglycidyl ether, and tetraethyleneglycol monodecyl ether; and wherein the glycol derivatives have a concentration between 1-2 wt % of TSHS.

10. The biocompatible task specific hybrid solvent (TSHS) composition as claimed in claim 1, wherein a metal in CCMO is selected from the group consisting of Zn, Cu, Ni, Cd or Ln; and wherein the CCMOs have a concentration between 300-500 ppm of TSHS.

11. The biocompatible task specific hybrid solvent (TSHS) composition as claimed in claim 1, wherein the rough surfaced basic nanoparticle is selected from the group consisting of a surface modified alkaline nanoparticle, calcium hydroxide nanoparticle, CaO nanoparticle, amine functionalized silica nanoparticle, amine-functionalized $MgFe_2O_4$, amine-functionalized $Fe_2O_3$—$SiO_2$ Core-Shell nanoparticles, pNTA-functionalized nanoparticles, and amine functionalized $TiO_2$ nanoparticles along with alkaline nanoparticles, wherein the nanoparticles have an alkaline core consisting of a substance selected from the group consisting of: calcium hydroxide, magnesium hydroxide magnesium carbonate, calcium carbonate, magnesium bis (hexamethyldisilazide), calcium bis(hexamethyldisilazide), calcium acetylacetonate hydrate, calcium 2,2,6,6,-tetramethyl-3,5-heptanedionate (Ca(TMHD)2), and mixtures thereof, and a hydrophilic cellulose derivative and a stabilizing outer layer comprising at least a stabilizer selected from the group consisting of: silylated hydrophobic polysaccharides, hydrophobic polysaccharides, poly(dimethylsiloxane) diglycidyl ether terminated and poly(dimethylsiloxane)aminopropyl terminated.

12. The biocompatible task specific hybrid solvent (TSHS) composition as claimed in claim 11, wherein the rough surfaces of the core particles are coated or covered with a polymer network, wherein the covered or coated particles are stable over a time in a dispersion formed thereof; and wherein the nanoparticles have a concentration between 100 to 150 ppm.

13. The biocompatible task specific hybrid solvent (TSHS) composition as claimed in claim 1, wherein the gas to liquid shuttle nano composite comprises nanoparticles selected from the group consisting of $SiO_2$, $Al_2O_3$, $TiO_2$, $Al_2O_3$, $TiCl_2$/Nano-γ-$Al_2O_3$, $CoFe_2O_4$, magnetic $Fe_3O_4$, $Ga_2O_3$, functional silica, colloidal $In_2O_3$, ZnO, CoO, $MnO_2$, $Fe_3O_4$, PbS, $MFe_2O_4$ (wherein M is Mn, or Zn), Lewis acid $ZrO_2$, silica boron sulfuric acid nanoparticles, Ni metal nanoparticles loaded on an acid-base bifunctional support comprising ($Al_2O_3$), $Co_3O_4$ nanoparticles; and wherein the gas to liquid shuttle nano composite has a concentration in a range between 50-100 ppm.

14. A process of preparing the biocompatible task specific hybrid solvent (TSHS) composition as claimed in claim 1, wherein said process comprises the steps of:

preparing a base amine solution by mixing $C_2$-$C_{10}$ alkalomine or hindered amine and $C_8$-$C_{10}$ hindered aromatic amines in the ratio of 5:1;

adding at least one prolinate derivative to the base amine solution at the rate of 0.2-0.5 ml/min.;

adding at least one intermediate stabilizer to the solution of prolinate and amines;

synthesizing a colloidal covalent metal-organic (CCMO) compound and adding the same to the solution of intermediate stabilizer, prolinate and amines at the rate of 2-10 ml/min.;

adding a surface modified alkaline nanoparticle and gas-liquid shuttle nanocomposite at an intermittent dosing rate of 0.4 ml-0.6 ml/min to at least one glycol derivative to obtain a homogenous colloidal solution;

adding the colloidal solution to the solution of CCMO and other components;

making up the volume with DI water and incubating the whole solution at 55° C. for 4 hours to obtain the TSHS system;

wherein controlling of said dosing of gas-liquid shuttle nanocomposite leads to a decrease in loading of $H_2S$/$SO_x$/$NO_x$ and enhancement in the $CO_2$ capture.

15. A process for $CO_2$ capture or recovery, wherein said process comprises the steps of:

providing a $CO_2$ source which is selected from carbon dioxide-containing flue gas, or process gas or gas from bio-methanation plants having $CO_2$ concentration ranging from 200 ppm to 900000 ppm in the source gas;

passing the $CO_2$ containing gas through the solvent composition as defined in any one of claims 1-13 in a device to form a fine dispersion of gas which results in an increase in contact area, sparging the carbon dioxide as a micro-bubble or a nanobubble, such that $CO_2$ of the $CO_2$ containing gas is absorbed by the solvent composition;

carrying out $CO_2$ desorption by thermal or solar assisted electro desalination method and amine regeneration by thermal, ultra-sonication and microwave irradiation;

wherein the pressure of $CO_2$ containing gas ranges from 0.1 bar to 10 bar and temperature ranges between 20-70° C.; and the regeneration step is performed at temperature ranging from 85-100° C.

* * * * *